US009477238B2

(12) United States Patent
Keizer et al.

(10) Patent No.: US 9,477,238 B2
(45) Date of Patent: *Oct. 25, 2016

(54) MONITORING HYDRAULIC FRACTURING (71) Applicant: Ecolab USA Inc., Naperville, IL (US)

(72) Inventors: Timothy S. Keizer, Aurora, IL (US); Jason R. Burney, Aurora, IL (US)

(73) Assignee: ECOLAB USA Inc., St. Paul, MN (US)

( * ) Notice: Subject to any disclaimer, the term of this patent is extended or adjusted under 35 U.S.C. 154(b) by 467 days.

This patent is subject to a terminal disclaimer.

(21) Appl. No.: 13/833,115

(22) Filed: Mar. 15, 2013

(65) Prior Publication Data

US 2014/0277745 A1    Sep. 18, 2014

(51) Int. Cl.
| G05D 11/00 | (2006.01) |
| G05D 21/02 | (2006.01) |
| G05D 11/13 | (2006.01) |

(52) U.S. Cl.
CPC ............. *G05D 21/02* (2013.01); *G05D 11/138* (2013.01)

(58) Field of Classification Search
None
See application file for complete search history.

(56) References Cited

U.S. PATENT DOCUMENTS

| 4,665,981 | A | 5/1987 | Hayatdavoudi |
| 4,901,563 | A | 2/1990 | Pearson |
| 5,066,199 | A | 11/1991 | Reese et al. |
| 5,195,879 | A | 3/1993 | Reese et al. |
| 5,302,253 | A | 4/1994 | Lessard et al. |
| 5,324,665 | A | 6/1994 | Lessard |
| 5,326,482 | A | 7/1994 | Lessard et al. |
| 6,685,840 | B2 | 2/2004 | Hatch |
| 6,845,336 | B2 | 1/2005 | Kodukula et al. |
| 6,851,444 | B1 | 2/2005 | Kohl et al. |
| 7,955,853 | B2 | 6/2011 | Hicks et al. |
| 8,068,033 | B2 | 11/2011 | Blokker et al. |
| 8,130,106 | B1 | 3/2012 | Hicks et al. |
| 2010/0059226 | A1 | 3/2010 | Termine et al. |
| 2010/0108566 | A1 | 5/2010 | Scattergood et al. |
| 2011/0137465 | A1* | 6/2011 | Angelilli et al. ............. 700/271 |
| 2012/0234756 | A1 | 9/2012 | Hicks et al. |
| 2013/0031970 | A1 | 2/2013 | Freese et al. |
| 2013/0126431 | A1* | 5/2013 | Henson ..................... C02F 9/00 210/638 |
| 2013/0255941 | A1* | 10/2013 | Olson et al. .................. 166/267 |
| 2014/0262233 | A1* | 9/2014 | Keizer et al. ............ 166/250.01 |

OTHER PUBLICATIONS

International Search Report and the Written Opinion from corresponding PCT Appln. No. PCT/US2014/022212 dated Jun. 25, 2014 (16 pgs).

* cited by examiner

*Primary Examiner* — Sean Shechtman
*Assistant Examiner* — Steven Garland
(74) *Attorney, Agent, or Firm* — Eric D. Babych; Brinks Gilson & Lione (57) ABSTRACT

This disclosure relates to systems, methods, and devices useful for monitoring and controlling water to be used, for example, in oil and natural gas production and hydraulic fracturing processes. An on-line unit for measuring, controlling, and optimizing the quality of water being used during the hydrocarbon production or hydraulic fracturing processes is also disclosed. Optimizing and controlling can include measuring one or more properties associated with the production water to be sure that the one or more properties are within an acceptable range and, if the one or more properties are not within the acceptable range for each respective property being measured, causing a change in flow of one or more water sources and/or one or more chemicals.

19 Claims, 1 Drawing Sheet

MONITORING HYDRAULIC FRACTURING

CROSS-REFERENCE TO RELATED APPLICATIONS

Not Applicable

FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This disclosure relates generally to systems, methods, and devices useful for monitoring water to be used, for example, in hydrocarbon production. More specifically, the disclosure relates to an on-line unit for measuring and optimizing the quality of water being used during hydrocarbon recovery or production processes, such as a hydraulic fracturing process.

2. Description of the Related Art

Oil and natural gas from shale formations play important roles in meeting the energy demands of the United States. Development of tight oil in the past few years has allowed domestic production of crude oil to increase from 5.1 million barrels a day in 2007 to 5.5 million barrels a day in 2010, reversing a decline in production that began in 1986. Continued development of tight oil will enable the US to produce 6.7 million barrels a day by 2020. Shale gas production is expected to increase from 5 trillion cubic feet in 2010 (23% of total US gas production) to 13.6 trillion cubic feet in 2035 (49% of total US gas production). To enable this large growth in oil and gas supply, numerous new wells will need to be drilled and stimulated via hydraulic fracturing.

Hydraulic fracturing involves pumping a water-sand-chemical mixture into a well at high pressure to fracture the shale formation surrounding the well and allow the natural gas to flow to the wellbore. The water quantities needed for well stimulation can range from 2 to 5 million gallons per well.

When a well begins producing, some of the water used during the stimulation begins to return to the surface. The first three months of production is called the flowback time, and is when the most water is returned to the surface with the oil and gas. After the flowback period, the flow of water returning to the surface slows, but continues. Over the life of the well, the amount of water that returns to the surface can range from as little as 10% to over 70% of the water used for the stimulation, or between 200,000 to 3.5 million gallons of water.

With such large amounts of water needed during the well stimulation, sourcing can be problematic. Well completion companies will source water wherever it is available. Sources can include livestock ponds, flowback water, produced water, river water, lake water, municipal water, etc. With all of the different sources of water being used in the well stimulation, chemical addition during the hydraulic fracturing process can be troublesome. Various chemicals such as biocides, scale inhibitors, and friction reducers can have dosages dependent upon the water quality, and in some cases, entirely different chemicals may be needed based on what type(s) of water is being used. On the fly changes of water have been known to lead to chemical over-dosage that deleteriously affects the fracturing process. An online tool for monitoring water quality during a fracturing process that would allow for proper chemical dosage would prohibit these harmful side effects.

BRIEF SUMMARY OF THE INVENTION

A method of monitoring and controlling one or more properties of production water is disclosed. The method comprises (a) providing a storage device; (b) introducing production water into the storage device; (c) providing a monitoring and controlling unit comprising a controller and a plurality of sensors in communication with the controller, wherein each of the plurality of sensors is operable to measure a property of the production water; (d) providing one or more pumps, which are in communication with the controller, wherein the one or more pumps can comprise one or more chemical injection pumps and one or more production water source pumps; (e) inputting an acceptable range for each of the one or more properties of the production water to be measured into the controller; (f) providing a delivery conduit having a first end submerged in the production water and a second end connected to an inlet of the monitoring and controlling unit; (g) pumping a sample of production water from the storage device into the monitoring and controlling unit; (h) measuring one or more properties of the sample of production water with the plurality of sensors; (i) determining if the measured one or more properties of the sample of production water is within the acceptable range inputted into the controller in step (e); wherein (j) if the measured one or more properties is outside of the acceptable range associated with that property inputted in step (e), causing a change in an influx of a chemical into the production water from the one or more chemical injection pumps, the chemical being capable of adjusting the measured property associated with the production water in a manner to bring the measured property within the acceptable range, or causing a change in a flow rate of the one or more production water source pumps; and (k) optionally repeating steps (a) to (i) to determine if the one or more properties has been brought within the acceptable range inputted in step (e).

Also provided is a system for optimizing one or more properties of production water. The system comprises (a) one or more sensors operable to measure a property associated with the production water and convert the measured property into an input signal capable of being transmitted; (b) a transmitter associated with each of the one or more sensors operable to transmit the input signal; (c) a controller operable to receive the transmitted input signal, convert the received input signal into an input numerical value, analyze the input numerical value, determine if the analyzed value is within an optimum range, generate an output numerical value based upon the analyzed value, convert the output numerical value into an output signal, and transmit the output signal; (d) a receiver operable to receive the output signal and cause a change in an influx rate of a chemical injected into the production water by one or more chemical injection pumps if the output numerical signal is not within the optimum range, wherein the chemical is capable of adjusting the measured property to come within the optimum range for that property, or cause a change in a flow rate of one or more production water source pumps.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION OF THE INVENTION

This disclosure relates to systems, methods, and devices useful for monitoring and controlling water to be used, for example, in oil and natural gas production. The disclosure also describes an on-line unit for measuring, controlling, and/or optimizing the quality of water being used during hydrocarbon recovery processes, such as a hydraulic fracturing process. The disclosure provides methods to measure, control, and/or optimize one or more system parameters or properties of water to be used in the production process so that the water produces optimal production results and does not detract from the production process in any manner. Optimization can include measuring one or more properties associated with the production water to be sure that the one or more properties are within an acceptable range and, if the one or more properties are not within the acceptable range for each respective property being measured, causing a change in flow of one or more water sources and/or one or more chemicals.

Figure 1:
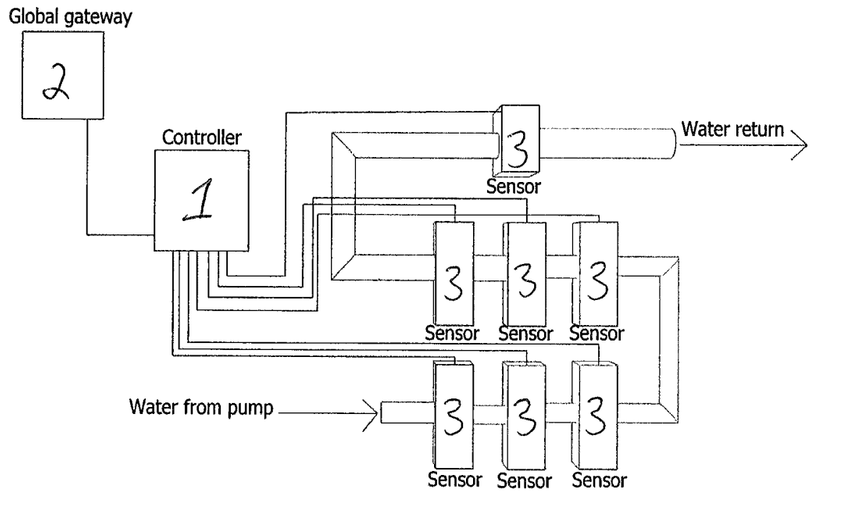
FIG. 1 is a schematic view showing various components of the presently disclosed system for measuring and optimizing one or more properties of production water.

In certain aspects, one of which is shown in FIG. 1, the system can include a monitoring and controlling unit that comprises a controller device (1) and a plurality of sensors (3). Each of the plurality of sensors (3) can be in communication with the controller. For example, if the unit comprises five sensors, each of the five sensors can be in communication with the controller. In certain aspects, the controller can be attached to a skid, or other type of support member. Further, the skid can be mounted inside of a mobile housing, such as a trailer. Thus, the monitoring and controlling unit can be mobile and moved around quite easily from site to site.

As used herein, the term "controller" or "controller device" refers to a manual operator or an electronic device having components such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components. The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components such as a signal conditioner or system monitor may be included to facilitate signal transmission and signal-processing algorithms.

In certain aspects, the controller includes hierarchy logic to prioritize any measured or predicted properties associated with system parameters. For example, the controller may be programmed to prioritize system pH over conductivity, or vice versa. It should be appreciated that the object of such hierarchy logic is to allow improved control over the system parameters and to avoid circular control loops.

In one aspect, the monitoring and controlling unit and method associated therewith includes an automated controller. In another aspect, the controller is manual or semi-manual. For example, where the system includes one or more datasets received from various sensors in the system, the controller may either automatically determine which data points/datasets to further process or an operator may partially or fully make such a determination. A dataset for production water, for instance, may include variables or system parameters such as ORP, DO, conductivity, pH, turbidity, concentrations of certain chemicals such as biocides, scale inhibitors, friction reducers, acids, bases, and/or oxygen scavengers, levels of ions (e.g., determined empirically, automatically, fluorescently, electrochemically, colorimetrically, measured directly, calculated), temperature, pressure, flow rate, total dissolved or suspended solids, etc. Such system parameters are typically measured with any type of suitable data capturing equipment, such as sensors designed specifically for these parameters, for example pH sensors, ion analyzers, temperature sensors, thermocouples, pressure sensors, corrosion probes, and/or any other suitable device or sensor. Data capturing equipment is in communication with the controller and, according to alternative embodiments, may have advanced functions (including any part of the control algorithms described herein) imparted by the controller.

Water to be used in production processes can be stored in storage devices. Hereinafter, water to be used in production processes can be referred to as "production water." According to the present disclosure, a storage device can be, for example, a pond, a pipeline, a working tank, a frac tank, or a similar device that could be used to store production water. Other devices used to store water to be used in hydrocarbon production processes known in the art are also covered under the term "storage device." In certain aspects of the present disclosure, a sample of production water can be drawn off from a storage device and routed through the controller to take various measurements of the water. For example, a conduit can have a first end within the storage device and a second end at an input location on the controller or an input location on the monitoring and controlling unit. The water can be pumped from the storage device, through the conduit, and into the controller device or monitoring and controlling unit.

In certain aspects, two samples of production water can be pumped into the controller or monitoring and controlling unit. For example, there may be a conduit running from a pond into the controller or monitoring and controlling unit and a second conduit running from a different storage device, such as a working tank or a frac tank, into the controller or monitoring and controlling unit. With this arrangement, samples of pond water can be routed through, and analyzed by, the controller or monitoring and controlling unit, while samples of other production water, such as production water being stored in a frac tank or a working tank, can also be routed through, and analyzed by, the controller or monitoring and controlling unit. It is also contemplated that in certain aspects, more than two samples of production water could be analyzed by the controller or monitoring and controlling unit. This would be accomplished by placing a conduit between the monitoring and controlling unit and each of a plurality of storage devices. The controller or monitoring and controlling unit would have separate inputs for each conduit and thus, each source of production water could be analyzed separately to determine the proper blend of water sources to be injected downhole.

The monitoring and controlling unit comprises a plurality of sensors, which are capable of analyzing the production water samples and transmitting data regarding the samples to the controller. The plurality of sensors can comprise, for example, sensors for measuring conductivity, pH, oxidation/reduction potential (ORP), biocide concentration, turbidity, temperature, flow, and dissolved oxygen (DO) in the water. The monitoring and controlling unit can comprise any of these sensors, all of these sensors, or a combination of two or more of these sensors, and in all aspects of this disclosure, the sensors can be in communication with the controller. It is also contemplated that any other type of sensor that can provide a 4-20 mA output can be connected to, and in communication with, the controller. Other types of sensors contemplated by the present disclosure can include, but are not limited to, oil in water sensors, total dissolved solids sensors, and total suspended solids sensors.

After the sample of production water is pumped from a storage device and routed through the monitoring and controlling unit, a conduit is present that routes the water back to, for example, the particular storage device from where it came, a different storage device, or to waste. Thus, in certain aspects, the controller or monitoring and controlling unit can have a delivery conduit (or two or more delivery conduits as previously described) for bringing water into the monitoring and controlling unit for analysis and it can also have one or more return conduits, which serve to return the analyzed water back to the storage device from which it came.

The presently disclosed monitoring and controlling system can also comprise, in certain aspects, one or more chemical injection pumps. These chemical injection pumps can be in fluid communication with the storage device, or each storage device if there is more than one storage device. For example, if the storage device is a pond, then one or more chemical injection pumps can be in fluid communication with the pond. In one aspect, there could be a conduit running from the chemical injection pump into the pond. If necessary, the chemical injection pump could then supply a chemical through the conduit and into the storage device comprising the production water. There can also be multiple chemical injection pumps and each pump can have a conduit running therefrom to the storage device, or each storage device if there is more than one storage device comprising production water. Each different chemical injection pump can have a different chemical housed therein, so that based upon the measurements of the sample of production water, one or more different chemicals could be added to the production water in the storage device to modify its properties. In other aspects, the chemical injection pumps do not need to comprise conduits for routing the chemical into the storage device but instead may be located sufficiently close to the storage device so that they can simply release chemicals into the storage device in a manner similar to a faucet over a sink. In all aspects, the presently disclosed chemical injection pumps can be in communication with the controller, as will be described hereinafter in greater detail. Furthermore, in certain aspects, the chemical injection pumps can simply be used to inject production water into the storage device.

The disclosed monitoring and controlling system provides methods to generate real-time, on-line, reliable data from production water. As previously mentioned, the production water can be stored in a storage device, such as a pond, and a sample thereof can be taken from the storage device, routed through a conduit, and injected into the controller or monitoring and controlling unit, where it is analyzed by a plurality sensors. Based upon the data received by the controller from the plurality of sensors, adjustments can be made to the production water.

For example, when the monitoring and controlling system comprises one or more chemical injection pumps, these chemical injection pumps can be in communication with the controller in any number of ways, including as examples through any combination of wired connection, a wireless connection, electronically, cellularly, through infrared, satellite, or according to any other types of communication networks, topologies, protocols, standards and more. Accordingly, the controller can send signals to the pumps to control their chemical feed rates or production water feed rates.

In addition, multiple sources of production water can be present on site. In certain aspects, production water can be pumped through a conduit from a pond and different production water can be pumped through a conduit from a frac tank or any other storage device. Each of the foregoing pumps can be in communication with (e.g., electronically, cellularly, etc.), and regulated by, the controller. These different sources of production water can be transported to a working tank, where they are combined. After their combination in the working tank, the combined/mixed production water is sent downhole to participate in, for example, a hydraulic fracturing process. In this aspect, a conduit can travel from an outlet in the working tank to an inlet of the controller or monitoring and controlling unit. Mixed production water exiting the working tank can thus be pumped and injected into the controller or monitoring and controlling unit. This water is then analyzed by the plurality of sensors and data regarding various water properties is generated. Based upon the data, the amount of pond water and/or frac tank water being used can be modified. For example, if the sensors determine that the conductivity of the water sample from the working tank is too high, then the controller can send a signal to increase the amount of pond water being used (i.e. signal the pump associated with the pond water to increase its flow rate) and/or decrease the amount of frac tank water being combined with the pond water before being sent downhole (i.e. signal the pump associated with the frac tank water to hold constant or decrease its flow rate).

In an aspect, such as that shown in FIG. 1, the monitoring and controlling system is implemented to have the plurality of sensors (3) provide continuous or intermittent feedback, feed-forward, or predictive information to the controller (1), which can relay this information to a relay device (2), such as the Nalco Global Gateway, which can transmit the information via cellular communications to a remote device, such as a cellular telephone, computer, or any other device that can receive cellular communications. This remote device can interpret the information and automatically send a signal (e.g. electronic instructions) back, through the relay device, to the controller to cause the controller to make certain adjustments to the output of the pumps. The information can also be processed internally by the controller and the controller can automatically send signals to the pumps, to adjust the amount of chemical injection, or to the pumps responsible for the flow rate of one or more production water sources. Based upon the information received by the controller from the plurality of sensors or from the remote device, the controller can transmit signals to the various pumps to make automatic, real-time adjustments, to the amount of chemical that the pumps are injecting into the production water or the amount of one or more sources of production water being sent downhole or sent to the working tank.

Alternatively, an operator of the remote device that receives cellular communications from the controller can manually manipulate the pumps through the remote device. The operator can communicate instructions, through the remote device, cellularly or otherwise, to the controller and the controller can make adjustments to the rate of chemical addition of the chemical injection pumps or the flow rate of a pump associated with a particular source of production water. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the production water by one or more of the injection pumps, increase or decrease the amount of a certain production water source being sent to the working tank or downhole, or any combination of the foregoing. The controller and/or the remote device is also capable of making any of the foregoing adjustments or modifications automatically without the operator actually sending or inputting any instructions. This capability can be because preset parameters or programs can be inputted into the controller or remote device so that the controller or remote device can determine if a measured property is outside of an acceptable range and based on the information received by the plurality of sensors, the controller or remote device can make appropriate adjustments to the pumps or send out an appropriate alert because it has been programmed to do so.

In certain aspects, the remote device or controller can include appropriate software to receive data from the plurality of sensors and determine if the data indicates that one or more measured properties of the water are within, or outside, an acceptable range. The software can also allow the controller or remote device to determine appropriate actions that should be taken to remedy the property that is outside of the acceptable range. For example, if the measured conductivity is above the acceptable range, the software allows the controller or remote device to make this determination and take remedial action, such as alerting a pump to increase the flow of pond water going into the working tank and/or alerting a pump to decrease the flow of frac tank water entering the working tank.

The monitoring and controlling system and/or controller disclosed herein can incorporate programming logic to convert analyzer signals from the plurality of sensors to pump adjustment logic and, in certain embodiments, control one or more of a plurality of chemical injection pumps, or production water source pumps, with a unique basis. Non-limiting, illustrative examples of the types of chemical injection pumps that can be manipulated include chemical injection pumps responsible for injecting biocides, scale inhibitors, friction reducers, acids, bases, sulfites, oxygen scavengers, and any other type of chemical that could prove to be useful. Particular examples of biocides, scale inhibitors, friction reducers, acids, bases, sulfites, and oxygen scavengers are all well-known in the art and all examples of such chemicals are contemplated to be within the scope of the present disclosure.

For example, in certain aspects, the biocide can be a member selected from the group consisting of peracetic acid, peroxide, bleach, glutaraldehyde, quaternary amines, and any combination thereof. The oxygen scavenger can be a sulfite, the acid can be hydrochloric acid (HCl), and the base can be sodium hydroxide (NaOH).

The presently disclosed controller can manage and interpret readings of the water from the sensors, such as biocide concentration, dissolved oxygen (DO) content, conductivity, total dissolved solids (TDS), pH, oxidation/reduction potential (ORP), turbidity, temperature, flow, oil in water, and total suspended solids. Sensors for all of these properties can be incorporated into the monitoring and controlling unit or sensors for any combination of these properties can be incorporated into the monitoring and controlling unit. For example, in certain aspects, the monitoring and controlling unit can include pH, conductivity, flow, temperature, and turbidity sensors. The pH sensor can measure the pH of the water sample, the conductivity sensor can measure the conductivity of the water sample, the flow sensor can monitor the flow of sample water through the unit to be sure that sample water is actually flowing therethrough, the temperature sensor can measure the temperature of the water, and the turbidity sensor can measure scattered light of the water wherein if the scattered light through the water sample is high, the water is impure, and could be, for example, too muddy.

Sensors for monitoring biocide concentration, ORP, DO, total dissolved solids, total suspended solids, corrosion, oil in water, etc., can also be included in the monitoring and controlling unit in any combination. The monitoring and controlling unit can include any combination of the sensors disclosed herein, and any other sensor capable of providing a 4-20 mA output. The readings from these sensors can be sent to and programmed through the controller, which can be, for example, a Programming Logic Controller (PLC), to possibly override or modify the chemical injection pump rates and/or the production water source pumps.

In an aspect, the disclosure provides a method for monitoring, controlling, and/or optimizing one or more properties of the production water to be sent downhole and used for the production process. A property, such as conductivity, pH, turbidity, etc., of the sample of production water is measured and/or predicted, and is subsequently converted into an input signal, such as an electrical input signal, capable of being transmitted from a sensor to the controller. In turn, the controller is operable to receive the transmitted input signal, convert the received signal into an input numerical value, analyze the input numerical value, generate an output numerical value, convert the output numerical value into an output signal, and transmit the output signal to, for example, the remote communication device or one or more of the chemical injection pumps or production water source pumps.

For example, an optimum conductivity range, pH range, biocide concentration range, dissolved oxygen range, etc., for the input numerical value can be determined and/or preselected and if the measured input numerical value for the specific property is outside of the optimum range, the transmitted output signal to the chemical injection pump or production water source pump causes a change in an influx of a chemical into the production water via the chemical pumps or causes a change in the flow rate of the production water source pump. The chemical is capable of adjusting the property associated with the system parameter in a manner to bring the input numerical value within the optimum range. Similarly, regulation of the flow rate of one or more production water source pumps is capable of adjusting the measured property in a manner to bring its input numerical value within the optimum range. The foregoing process can be run initially on a sample of the production water from the storage device and, if adjustments need to be made to the water based upon the initial input numerical value, the adjustments can be made to the various pumps and thereafter, the process can be conducted again to determine if the property of the production water has been brought within the optimum range.

The method is optionally repeated for a plurality of different system parameters, where each different system parameter has a unique associated property, or, alternatively, all system parameters can be analyzed concurrently by the plurality of sensors.

In certain aspects, as previously mentioned, the software associated with the controller or remote device can include acceptable parameters for various water properties or these acceptable parameters can be programmed into the controller or remote device, so that the controller or remote device will know if a particular measured property is within, or outside, an acceptable range. With respect to pH, an acceptable range could be between about 5-10. In certain aspects, the acceptable range could be between about 6 and about 9. In other aspects, the acceptable range could be between about 7 and about 8. With respect to DO, an acceptable range could be less than 5 ppm. In other aspects, the acceptable range could be less than 1 ppm. With respect to conductivity, an acceptable range could be less than 100,000 µS. In other aspects, an acceptable range could be less than 70,000 µS. In certain embodiments, the acceptable range could be less than 30,000 µS. With respect to residual biocide, the acceptable range could be less than 50 ppm. In other aspects, the acceptable range could be less than 20 ppm. In certain aspects, the acceptable range could be less than 10 ppm. Also, with respect to total suspended solids, the acceptable range could be less than 100 ppm. In other aspects, the acceptable range could be less than 50 ppm. In certain aspects, the acceptable range could be less than 10 ppm.

In any event, the controller and/or remote device can determine if any of the measured properties are outside of their acceptable range and the controller or remote device can make automatic remedial adjustments to bring this property of the water within the acceptable range. For example, if the measured conductivity is above 100,000 µS, the controller or remote device can send a signal to a production water source pump to increase the flow of pond water into the working tank to lower the conductivity to within the acceptable range and/or the controller or remote device can send a signal to a production water source pump to stop or decrease the flow of frac tank water into the working tank to decrease the conductivity and bring it within the acceptable range. As an additional illustrative example, if the measured pH of the water is below 5, the controller or remote device can send a signal to a chemical injection pump to add a base to the production water in the storage device to increase the pH of the production water and bring it within the acceptable range.

As noted herein, the monitoring and controlling unit comprises a plurality of sensors operable to sense and/or predict a property associated with the water or system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value to determine if the input numerical value is within an optimum range, generate an output numerical value, convert the output numerical value into an output signal, e.g., an electrical signal, and transmit the output signal to a receiver, such as a pump incorporating such receiver capabilities or a remote device, such as a computer or cellular telephone, incorporating receiver capabilities. The receiver receives the output signal and either alerts an operator to make adjustments to flow rates of the pumps, or the receiver can be operable to cause a change in a flow rate of the pumps automatically, if the output numerical value is not within the acceptable range for that property.

A production water control program can include components such as neutralizing chemicals, biocides, corrosion inhibitors, acids, bases, scale inhibitors, oxygen scavengers, friction reducers, etc. Such chemicals have been traditionally injected into the production water based upon measurements derived from grab samples of the production water that were analyzed in a lab. However, these types of measurements can lead to overdosing or under-dosing certain chemicals to the water, or introducing too much/too little fresh water or pond water into the production water blend, because a significant amount of time can lapse between taking the initial sample, bringing the sample to the lab for analysis, and returning to the field to treat the production water. During this time period, the chemistry of the production water in the storage device can be changed, either intentionally or naturally, and thus, the water tested in the laboratory will not be indicative of the water in the field. To overcome such problems, the present disclosure provides a mobile, on-line, real-time, automated method of monitoring the production water and controlling its properties by chemical injection or flow regulation, without the need to measure water quality of the production water in a laboratory or other testing facility involving grab sampling techniques.

Data transmission of measured parameters or signals to chemical pumps, production water source pumps, alarms, remote monitoring devices such as computers or cellular telephones, or other system components is accomplished using any suitable device, and across any number of wired and/or wireless networks, including as examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used. As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

In an embodiment, system parameter information is received from the system and archived. In another embodiment, system parameter information is processed according to a timetable or schedule. In a further embodiment, system parameter information is immediately processed in real-time or substantially real-time. Such real-time reception may include, for example, "streaming data" over a computer network.

In certain embodiments, multiple production water or system parameters, or other constituents present in the production water, could be measured and/or analyzed. Representative measured parameters or constituents include chloride ion, strong or weak acids such as sulfuric, sulfurous, thiosulfurous, carbon dioxide, hydrogen sulfide, and organic acids, ammonia, various amines, and liquid or solid deposits. Various methods of measuring such parameters are contemplated and this disclosure is not limited to any particular method. Representative methods include, but are not limited to, those disclosed in U.S. Pat. No. 5,326,482, titled "On-Line Acid Monitor and Neutralizer Feed Control of the Overhead Water in Oil Refineries"; U.S. Pat. No. 5,324,665, titled "On-Line Method for Monitoring Chloride Levels in a Fluid Stream"; U.S. Pat. No. 5,302,253, titled "On-Line Acid Monitor and Neutralizer Feed Control of the Overhead Water in Oil Refineries," each of which is incorporated herein by reference in its entirety.

The chemicals to be added to the system or production water, such as the acids, bases, biocides, scale inhibitors, friction reducers, etc., may be introduced to the system or production water using any suitable type of chemical injection pump. Most commonly, positive displacement injection pumps are used and are powered either electrically or pneumatically. Continuous flow injection pumps can also be used to ensure specialty chemicals are adequately and accurately injected into the rapidly moving process stream. Though any suitable pump or delivery system may be used, exemplary pumps and pumping methods include those disclosed in U.S. Pat. No. 5,066,199, titled "Method for Injecting Treatment Chemicals Using a Constant Flow Positive Displacement Pumping Apparatus" and U.S. Pat. No. 5,195,879, titled "Improved Method for Injecting Treatment Chemicals Using a Constant Flow Positive Displacement Pumping Apparatus," each incorporated herein by reference in its entirety.

The chemicals to be added to the production water can be added to the water at any point prior to introduction of the water downhole. For example, the chemicals can be added into the working tank, into the pond, into the frac tank, into any other storage device, or into any conduit that is involved in the transportation of the production water downhole.

It should be appreciated that a suitable or optimal range for a particular parameter or property should be determined for each individual system or each individual body of production water. The optimum range for one system or body of water may vary considerably from that for another system or body of water. For example, optimal or acceptable ranges could be different when comparing production water to be used in the initial stages of hydrocarbon recovery and production water to be used for hydraulic fracturing. It is within the concept of the invention to cover any possible optimum ranges for the contemplated system parameters or properties.

In some embodiments, changes in the chemical injection pumps are limited in frequency. In some aspects, adjustment limits are set at a maximum of 1 per 15 min and sequential adjustments in the same direction may not exceed 8, for example. In some embodiments, after 8 total adjustments or a change of 50% or 100%, the pump could be suspended for an amount of time (e.g., 2 or 4 hours) and alarm could be triggered. If such a situation is encountered, it is advantageous to trigger an alarm to alert an operator. Other limits, such as maximum pump output may also be implemented. It should be appreciated that it is within the scope of the invention to cause any number of adjustments in any direction without limitation. Such limits are applied as determined by the operator or as preset into the controller.

In accordance with an aspect of the present disclosure, a method of monitoring and controlling one or more properties of production water is provided. One or more properties means that the method can control or monitor one property of the production water, two properties of the production water, three, four, five, six, or more, properties of the production water. As previously mentioned, the properties can be pH, conductivity, turbidity, flow, temperature, etc.

The method can comprise the step of (a) providing a storage device for the production water. In certain aspects, more than one storage device can be provided, such as two storage devices or three storage devices. For example, the storage devices can be a pond, a frac tank, and a working tank.

The method can also comprise the step of (b) introducing production water into the storage device (or storage devices). Moreover, the method includes the step of (c) providing a monitoring and controlling unit comprising a controller and a plurality of sensors in communication with the controller, wherein each of the plurality of sensors is operable to measure a property of the production water. For example, in one aspect, the unit can comprise five sensors, wherein each sensor is operable to measure a different property, such as pH, temperature, flow, conductivity, and turbidity.

The method can further include the step of (d) providing one or more pumps, which are in communication with the controller, wherein the one or more pumps can comprise one or more chemical injection pumps and one or more production water source pumps. For example, a chemical injection pump can be provided that is operable to inject a biocide into the production water, a chemical injection pump can be provided that is operable to inject an oxygen scavenger into the production water, a chemical injection pump can be provided that is operable to inject an acid into the production water, a chemical injection pump can be provided that is operable to inject a base into the production water, and/or a chemical injection pump can be provided that is operable to inject a sulfite into the production water. Moreover, if the method includes more than one storage device for the production water, then more than one production water source pumps can be provided. Illustratively, if the method includes a pond storage device, a frac tank storage device, and a working tank storage device, then three production water source pumps can be provided. The production water source pump associated with the pond can regulate the flow of this production water source and the production water source pump associated with the frac tank can regulate the flow of this production water source. Thus, when each of these different water sources are combined or blended in the working tank, each respective pump can control the amount of each specific type of production water entering the working tank.

The method can also comprise the step of (e) inputting an acceptable range for each of the one or more properties of the production water to be measured into the controller. As previously noted, with respect to the property of pH, an operator could input an acceptable range of 5-10 into the controller, for example.

The method can also comprise the step of (f) providing a delivery conduit having a first end submerged in the production water and a second end connected to an inlet of the monitoring and controlling unit. However, if more than one storage device is provided housing more than one source of production water, for example, two storage devices or three storage devices, then the method can comprise the step of providing two delivery conduits or three delivery conduits, each delivery conduit having a respective inlet on the monitoring and controlling unit.

The method can also comprise the step of (g) pumping a sample of production water from
the storage device(s) into the monitoring and controlling unit and (h) measuring one or more properties of the sample of production water with the plurality of sensors.

Further, the method can comprise the step of (i) determining if the measured one or more properties of the sample of production water is within the acceptable range inputted into the controller in step (e). This determining step can be automatically performed by the controller and in this step, the measured value for each measured property is compared to the acceptable range inputted for that specific property.

The method can also comprise the step (j) wherein if the measured one or more properties is outside of the acceptable range associated with that property inputted in step (e), causing a change in an influx of a chemical into the production water from the one or more chemical injection pumps, the chemical being capable of adjusting the measured property associated with the production water in a manner to bring the measured property within the acceptable range and/or causing a change in a flow rate of the one or more production water source pumps. For example, if the measured property of pH is higher than 10, then a chemical injection pump can be signaled and caused to inject an acid into the production water, to bring the pH within the acceptable range of 5-10. As an additional example, if the measured property of conductivity (or turbidity) is higher than the upper limit of the acceptable range, then a production water source pump can be signaled and caused to increase the flow rate of the fresh production water source to lower the conductivity (or turbidity) of the blend of production water being sent into the working tank or downhole. Moreover, if the measured conductivity is higher, or at the higher end of the acceptable range, then a chemical injection pump could be signaled and caused to inject a greater amount of biocide into the production water.

The method can also include step (k) wherein steps (a) to (i) are optionally repeated to determine if the one or more properties has been brought within the acceptable range inputted in step (e). If each measured property has been brought within the acceptable range for that measured property after step (i), (j), or (k), then the production water or blend of production waters is suitable for its intended purpose and can be injected downhole. However, if one or more measured properties are substantially outside of the inputted acceptable ranges for those properties, and it would require a large amount of time or resources to bring the one or more properties within the acceptable range for that property, then that body of production water can simply be diverted to waste.

Certain aspects of the presently disclosed methods and monitoring and controlling systems have been uniquely developed. For example, the monitoring and controlling unit can be mobile. Mobility of this unit provides numerous benefits over the pre-existing stationary devices. As one example, a typical hydraulic fracturing procedure could last from 3 days to two weeks. Once the procedure is completed, the team moves on to the next site to perform another hydraulic fracturing procedure. Thus, when the team may be moving from site to site every week or so, mobility of the monitoring and controlling unit is extremely beneficial.

Also, due to the extraordinary nature of the water to be used in production, various sensors used in connection with the present disclosure were modified in a manner such that they would be useful in connection with the production water. As an example, the conductivity sensor had to be experimentally tested and modified such that it could measure significantly higher conductivities than the prior art conductivity sensors. Where the prior art conductivity sensors used to monitor and control various waters associated with industrial aqueous systems may have been able to measure conductivities up to about 20,000 microsiemens (μS), the presently disclosed conductivity sensors can measure conductivity up to about 2 million μS.

For example, a sensor used in connection with the present disclosure can measure conductivity in a range of about 250 μS to about 2 million μS, or any subrange thereof. In certain aspects, a sensor used in connection with the present disclosure can measure conductivity in a range of about 25,000 μS to about 2 million μS, or any subrange thereof, such as from about 30,000 μS to about 2 million μS, from about 30,000 μS to about 1 million μS, from about 30,000 μS to about 500,000 μS, from about 50,000 μS to about 2 million μS, or from about 70,000 μS to about 2 million μS. Again, any range between about 250 μS and about 2 million μS is contemplated and capable of being measured by the conductivity sensors used in connection with the present disclosure.

As previously noted, production water is unique when compared to many other types of water used in other aqueous industrial systems because it has a very high total dissolved solids (TDS) content. Moreover, the production water could include oil and thus have a high suspended solids content. High TDS and suspended solid properties of the production water can lead to an increase in the conductivity of the water and thus, incorporating sensors into the controller or system that can measure extraordinarily high conductivities can be useful or essential in some cases.

All of the compositions, systems, and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

The systems, devices, and logic described above, such as the controller, can be implement in many different ways in many different combinations of hardware, software, or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the controller may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of monitoring and controlling one or more properties of production water comprising:
   (a) providing a storage device;
   (b) introducing production water into the storage device before measuring one or more properties of the production water;
   (c) providing a monitoring and controlling unit comprising a controller and a plurality of sensors in communication with the controller, wherein each of the plurality of sensors is operable to measure a property of the production water;
   (d) providing one or more pumps, which are in communication with the controller, wherein the one or more pumps can comprise one or more chemical injection pumps and one or more production water source pumps;
   (e) inputting an acceptable range for each of the one or more properties of the production water to be measured into the controller;
   (f) providing a delivery conduit having a first end submerged in the production water and a second end connected to an inlet of the monitoring and controlling unit;
   (g) pumping a sample of production water from the storage device directly into the monitoring and controlling unit;
   (h) measuring one or more properties of the sample of production water with the plurality of sensors;
   (i) determining if the measured one or more properties of the sample of production water is within the acceptable range inputted into the controller in step (e); wherein
   (j) when the measured one or more properties is outside of the acceptable range associated with that property inputted in step (e), causing a change in an influx of a chemical into the production water from the one or more chemical injection pumps, the chemical being capable of adjusting the measured property associated with the production water in a manner to bring the measured property within the acceptable range, or causing a change in a flow rate of the one or more production water source pumps;
   (k) pumping the sample of production water from the monitoring and controlling unit directly back into the storage device; and
   (l) optionally repeating steps (a) to (i) to determine if the one or more properties has been brought within the acceptable range inputted in step (e).

2. The method of claim 1, including: (i) converting the measured property into an input signal capable of being transmitted to the controller and (ii) transmitting the input signal to the controller.

3. The method of claim 2, including transmitting the input signal via a wireless interface.

4. The method of claim 2, wherein the controller is operable to: (i) receive the transmitted input signal; (ii) convert the received signal into an input numerical value; (iii) analyze the input numerical value: (iv) generate an output numerical value; (v) convert the output numerical value into an output signal; and (vi) transmit the output signal.

5. The method of claim 4, including transmitting the output signal via a wireless interface.

6. The method of claim 4, wherein the controller is operable to: (i) analyze the input numerical value and (ii) determine if the input numerical value corresponds to the acceptable range associated with the measured property.

7. The method of claim 6, wherein if the input numerical value does not correspond to the acceptable range, the transmitted output electrical signal causes a change in the influx of the chemical into the production water, the chemical being capable of adjusting the property in a manner to cause the input numerical value to correspond to the acceptable range associated with that property, or causing a change in a flow rate of the one or more production water source pumps.

8. The method of claim 1, including continuously or intermittently measuring the one or more properties of the production water.

9. The method of claim 1, including monitoring the one or more properties in real time.

10. The method of claim 1, wherein the one or more chemicals are selected from the group consisting of biocides, scale inhibitors, corrosion inhibitors, friction reducers, acids, bases, sulfites, and oxygen scavengers.

11. The method of claim 1, wherein the one or more sensors are operable to measure properties of the production water selected from the group consisting of conductivity, pH, oxidation/reduction potential, biocide concentration, turbidity, temperature, flow, dissolved oxygen, total suspended solids, and total dissolved solids.

12. The method of claim 1, including operating the method continuously, automatically, and online or on a batch basis.

13. The method of claim 1, wherein the monitoring and controlling unit is provided on a mobile skid.

14. The method of claim 1, including operating the method over a network.

15. A non-transitory digital storage medium having computer-executable instructions stored thereon, the instructions operable to execute the method of claim 1.

16. A system for optimizing one or more properties of production water, the system comprising:
 (a) one or more sensors operable to measure a property associated with the production water and convert the measured property into an input signal capable of being transmitted, the production water being in a storage device before being measured by the one or more sensors, the production water being returned directly to the storage device after being measured by the one or more sensors;
 (b) a transmitter associated with each of the one or more sensors operable to transmit the input signal;
 (c) a controller operable to receive the transmitted input signal, convert the received input signal into an input numerical value, analyze the input numerical value, determine if the analyzed value is within an acceptable range, generate an output numerical value based upon the analyzed value, convert the output numerical value into an output signal, and transmit the output signal;
 (d) a receiver operable to receive the output signal and cause a change in an influx rate of a chemical injected into the production water by one or more chemical injection pumps if the output numerical signal is not within the acceptable range, wherein the chemical is capable of adjusting the measured property to come within the acceptable range for that property, or cause a change in a flow rate of one or more production water source pumps.

17. The system of claim 16, wherein said one or more sensors and controller are provided on a mobile skid.

18. The system of claim 16, wherein the one or more chemical injection pumps, the one or more production water source pumps, a computer, or a cellular device comprises the receiver.

19. The system of claim 16, wherein said one or more sensors comprises a sensor for measuring conductivity of the production water, wherein said conductivity sensor can measure conductivities from about 25,000 μS to about 2 million μS.

* * * * *